(12) United States Patent
Russell, II et al.

(10) Patent No.: US 7,781,637 B2
(45) Date of Patent: Aug. 24, 2010

(54) SEGMENTED WASTE RODS FOR HANDLING NUCLEAR WASTE AND METHODS OF USING AND FABRICATING THE SAME

(75) Inventors: William Earl Russell, II, Wilmington, NC (US); Robert Bryant James, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 51 days.

(21) Appl. No.: 12/219,904

(22) Filed: Jul. 30, 2008

(65) Prior Publication Data

US 2010/0030008 A1   Feb. 4, 2010

(51) Int. Cl.
G21F 1/00 (2006.01)
(52) U.S. Cl. .................................... 588/16; 588/15
(58) Field of Classification Search ................... 588/16, 588/15
See application file for complete search history.

(56) References Cited

U.S. PATENT DOCUMENTS

| | | | |
|---|---|---|---|
| 3,015,616 A | 1/1962 | Sturtz et al. | |
| 3,940,318 A | 2/1976 | Arino et al. | |
| 3,998,691 A | 12/1976 | Shikata et al. | |
| 4,196,047 A | 4/1980 | Mitchem et al. | |
| 4,284,472 A | 8/1981 | Pomares et al. | |
| 4,462,956 A | 7/1984 | Boiron et al. | |
| 4,475,948 A | 10/1984 | Cawley et al. | |
| 4,493,813 A | 1/1985 | Loriot et al. | |
| 4,532,102 A | 7/1985 | Cawley | |
| 4,582,668 A * | 4/1986 | Mallory et al. | 376/203 |
| 4,597,936 A | 7/1986 | Kaae | |
| 4,617,985 A | 10/1986 | Triggs et al. | |
| 4,619,808 A | 10/1986 | Formanek | |
| 4,663,111 A | 5/1987 | Kim et al. | |
| 4,729,903 A | 3/1988 | McGovern et al. | |
| 4,740,350 A | 4/1988 | Taleyarkhan | |
| 4,782,231 A | 11/1988 | Svoboda et al. | |
| 4,818,473 A | 4/1989 | Lui | |
| 4,859,431 A | 8/1989 | Ehrhardt | |
| 5,009,837 A * | 4/1991 | Nguyen et al. | 376/261 |
| 5,053,186 A | 10/1991 | Vanderheyden et al. | |
| 5,145,636 A | 9/1992 | Vanderhevden et al. | |
| 5,196,161 A | 3/1993 | Lewis | |
| 5,355,394 A | 10/1994 | Van Geel et al. | |
| 5,400,375 A | 3/1995 | Suzuki et al. | |
| 5,513,226 A | 4/1996 | Baxter et al. | |
| 5,596,611 A | 1/1997 | Ball | |
| 5,615,238 A | 3/1997 | Wiencek et al. | |
| 5,633,900 A | 5/1997 | Hassal | |
| 5,682,409 A | 10/1997 | Caine | |
| 5,740,218 A * | 4/1998 | Frederickson et al. | 376/442 |
| 5,758,254 A | 5/1998 | Kawamura et al. | |
| 5,778,035 A | 7/1998 | Nylund | |
| 5,867,546 A | 2/1999 | Hassal | |
| 5,871,708 A | 2/1999 | Park et al. | |
| 5,910,971 A | 6/1999 | Ponomarev-Stepnoy et al. | |
| 6,056,929 A | 5/2000 | Hassal | |
| 6,160,862 A | 12/2000 | Wiencek et al. | |
| 6,192,095 B1 | 2/2001 | Sekine et al. | |
| 6,233,299 B1 | 5/2001 | Wakabayashi | |
| 6,456,680 B1 | 9/2002 | Abalin et al. | |
| 6,539,073 B1 | 3/2003 | Smith et al. | |
| 6,678,344 B2 | 1/2004 | O'Leary et al. | |
| 6,751,280 B2 | 6/2004 | Mirzadeh et al. | |
| 6,804,319 B1 | 10/2004 | Mirzadeh et al. | |
| 6,895,064 B2 | 5/2005 | Ritter | |
| 6,896,716 B1 | 5/2005 | Jones, Jr. | |
| 7,157,061 B2 | 1/2007 | Meikrantz et al. | |
| 7,235,216 B2 | 6/2007 | Kiselev et al. | |
| 7,525,112 B2 * | 4/2009 | Engelhardt | 250/506.1 |
| 2002/0034275 A1 | 3/2002 | Abalin et al. | |
| 2003/0012325 A1 | 1/2003 | Kernert et al. | |
| 2003/0016775 A1 | 1/2003 | Jamriska, Sr. et al. | |
| 2003/0103896 A1 | 6/2003 | Smith | |
| 2003/0179844 A1 | 9/2003 | Filippone | |
| 2004/0091421 A1 | 5/2004 | Aston et al. | |
| 2004/0105520 A1 | 6/2004 | Carter | |
| 2004/0196942 A1 | 10/2004 | Mirzadeh et al. | |
| 2004/0196943 A1 | 10/2004 | Di Caprio | |
| 2005/0105666 A1 | 5/2005 | Mirzadeh et al. | |
| 2005/0118098 A1 | 6/2005 | Vincent et al. | |
| 2006/0062342 A1 | 3/2006 | Gonzalez Lepera et al. | |
| 2006/0126774 A1 | 6/2006 | Kim et al. | |
| 2007/0133731 A1 | 6/2007 | Fawcett et al. | |
| 2007/0133734 A1 | 6/2007 | Fawcett et al. | |
| 2007/0297554 A1 | 12/2007 | Lavie et al. | |
| 2008/0031811 A1 | 2/2008 | Ryu et al. | |
| 2008/0076957 A1 | 3/2008 | Adelman | |

OTHER PUBLICATIONS

U.S. Appl. No. 11/002,677 "Rod Assembly for Nuclear Reactors", Inventor: Russell Fawcett, Filing date: Dec. 3, 2004.*

* cited by examiner

Primary Examiner—Timothy C Vanoy
Assistant Examiner—Michelle Hou
(74) Attorney, Agent, or Firm—Harness, Dickey & Pierce, P.L.C.

(57) ABSTRACT

Example embodiments and methods may provide segmented waste rods capable of containing and disposing of waste generated from spent nuclear fuel, including elements left over from fuel that has been harvested for desired isotopes produced in the fuel. Example methods may provide methods for forming and using example embodiment segmented waste rods.

16 Claims, 5 Drawing Sheets

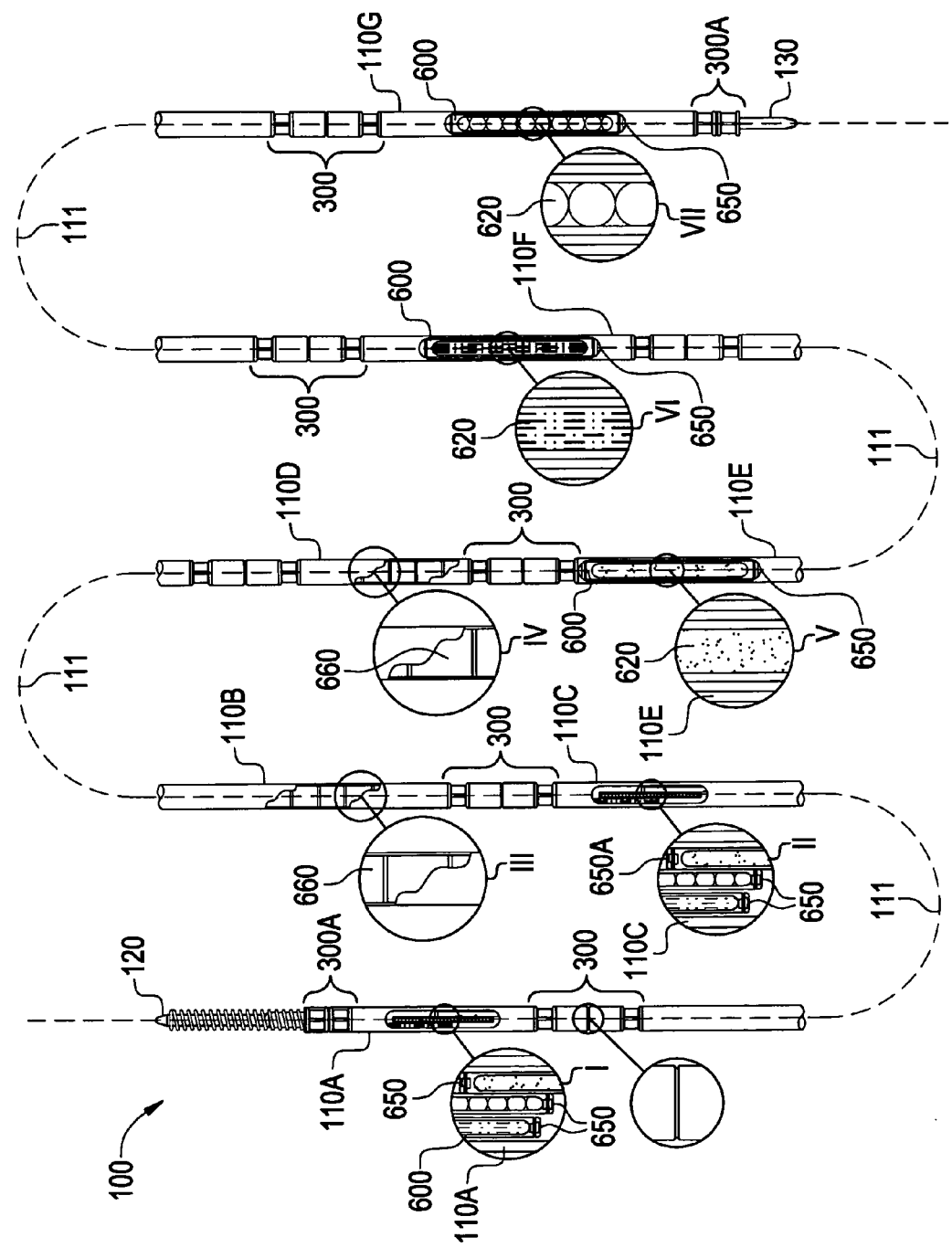

SEGMENTED WASTE RODS FOR HANDLING NUCLEAR WASTE AND METHODS OF USING AND FABRICATING THE SAME

BACKGROUND

1. Field

Example embodiments generally relate to fuel structures used in nuclear power plants, handling of waste generated in nuclear power plants, and methods for using and fabricating structures for waste handling.

2. Description of Related Art

Generally, nuclear power plants include a reactor core having fuel arranged therein to produce power by nuclear fission. A common design in U.S. nuclear power plants is to arrange fuel in a plurality of cladded fuel rods bound together as a fuel assembly, or fuel bundle, placed within the reactor core. During power operations, the fuel is irradiated with neutrons sustaining the fission chain reaction, and multiple radioactive elements are formed throughout the fuel as a result.

Power operations are generally sustained for several months or years, until the fuel is exhausted or cannot support the fission chain reaction, at which time the nuclear power plant undergoes an "outage" to replace the fuel and perform other maintenance. Typically, nuclear fuel is accessible only during such outages and is very radioactive, requiring strict handling, storage, and/or disposal guidelines to prevent contamination and radiation exposure. Spent fuel and related waste handled during an outage may remain radioactive for several years, requiring constant containment and special handling throughout its lifetime.

Spent nuclear fuel and other related waste are conventionally disposed of by either placing the spent fuel in a spent fuel pool to allow the fuel to further decay while being safely stored or transporting and placing the fuel and/or other waste in special hazardous materials landfills that may contain the radioactivity present in the waste.

SUMMARY

Example embodiments are directed to structures capable of containing and disposing of waste generated from spent nuclear fuel, including elements left over from fuel that has been harvested for desired isotopes produced in the fuel. Example methods may provide methods for forming and using example embodiment waste disposal structures.

Example embodiments may provide a segmented waste rod having one or more waste rod segments capable of containing and/or recycling at least upper and lower end plugs, cladding, container assemblies and caps, and/or upper and lower rod extensions in example embodiment segmented waste rods. Example embodiment segmented waste rods may have substantially similar outer features to disclosed segmented rods usable for generating power and/or producing desired isotopes in a nuclear reactor, and may be placed into fuel bundles containing the same for storage and/or disposal.

Example methods may provide methods of waste handling by fabricating and using example embodiment waste rod segments and segmented waste rods.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 1 is an illustration of a segmented fuel rod usable with example embodiments and methods.

DETAILED DESCRIPTION

Figure 2A:
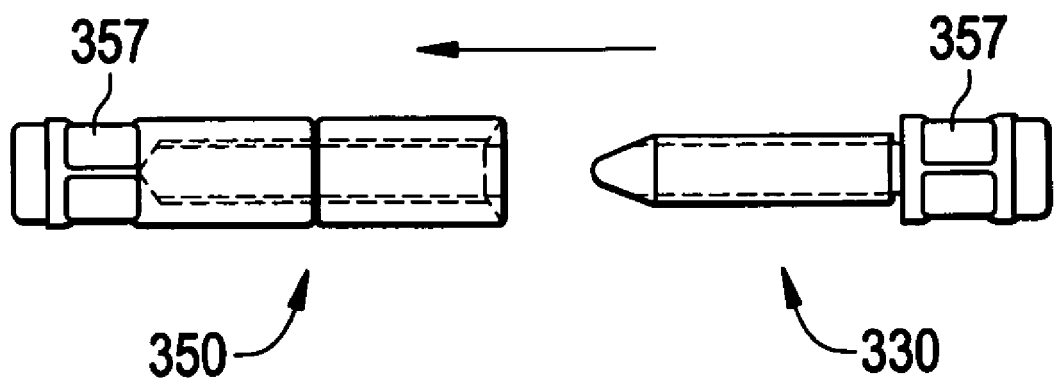
FIGS. 2A and 2B are detailed illustrations of connections between segments of segmented fuel rods usable with example embodiments and methods.

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures and/or actions shown in succession may in fact be executed substantially concurrently or may sometimes be executed in the reverse order, depending upon the functionality/acts involved.

The inventors of the present application have disclosed segmented fuel rods usable in the generation of nuclear power and/or radioisotopes in related applications. These applications, Ser. No. 11/002,677, "ROD ASSEMBLY FOR NUCLEAR REACTORS;" Ser. No. 11/002,680, "METHOD OF PRODUCING ISOTOPES IN POWER NUCLEAR REACTORS;" and Ser. No. 11/987,160, "SEGMENTED FUEL ROD BUNDLE DESIGNS USING FIXED SPACER PLATES" are incorporated herein by reference in their entirety. Particularly, the term "segmented rod" as used herein incorporates by reference the segmented rod shown in FIG. 13 and associated description in the '677 application. Although the above-referenced applications are usable with example embodiments and methods disclosed herein, it is understood that other nuclear rod and waste configurations are equally usable with example embodiments and methods.

Example embodiment segmented waste rods having example embodiment waste rod segments are discussed first below. Thereafter, example methods, which may fabricate and use example embodiment waste rod segments and segmented waste rods containing the same are described. It is understood that, to the degree example embodiments are referenced in example methods, alternate and/or other undisclosed structures may be fabricated and used in example methods.

Segmented Waste Rod and Waste Rod Segments

FIG. 1 illustrates a related art segmented rod design usable with example methods and embodiments and disclosed in the '677 application incorporated above. As shown in FIG. 1, a plurality of rod segments 110A, 110B, 110C, 110D, 110E, 110F, and 110G may be joined between upper and lower end pieces 120 and 130 (also referred to as upper extension 120 and lower extension 130) to form a segmented fuel rod 100 usable in power-producing nuclear reactors. Each rod segment 110A-G may be individually cladded with cladding similar to that found in conventional nuclear fuel.

Each rod segment 110A-G may also contain an irradiation target. Some segments, such as segment 110B, may contain nuclear fuel pellets 660, similar to that used in conventional nuclear fuel, as the irradiation target. Other segments, such as segment 110A and/or 110E, may contain other materials 620 that convert to desired isotopes when exposed to a neutron flux, as the irradiation target. The irradiation targets 620 may be contained within a container assembly 600 placed within individual segments 110 in order to segregate and more easily harvest isotopes produced from the irradiation target materials 620.

Each segment 110 is removably mated between upper and lower extensions 120 and 130 by connections 300. In this way, a modular fuel rod 100 may contain several different types of separated targets in one or more segments 110.

Figure 2B:
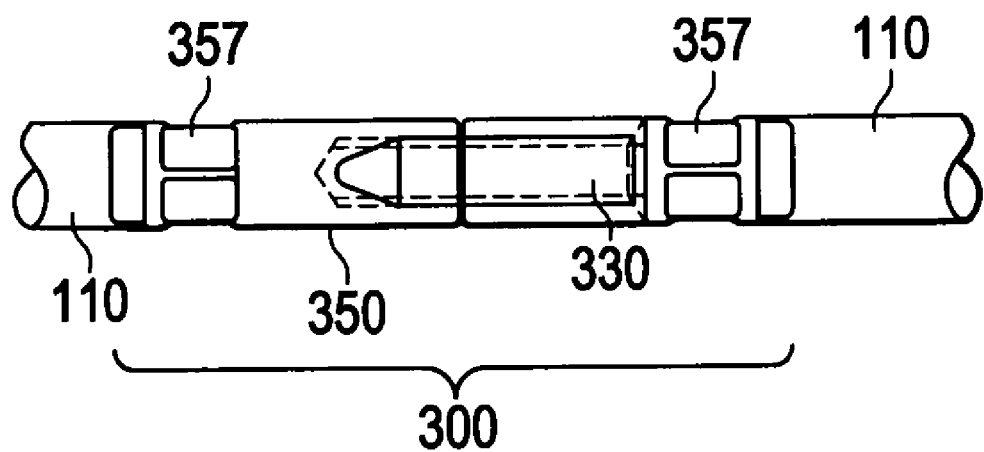

FIGS. 2A and 2B are detailed illustrations of the connection 300 between segments 110 of the example segmented rod 100 shown in FIG. 1. As shown in FIG. 2A, two segments, a male end plug 330 and a female end plug 350 (sometimes referred to as adaptor subassemblies in the incorporated documents), may be removably mated to other segments 110 (shown in FIGS. 1 and 2B) by, for example, welding. Male and female end plugs 330 and 350 may have complementary features that permit union of the plugs 330 and 350. For example, male and female end plugs 330 and 350 may be a screw and threaded hole, or a tang (a tapered extension) and receptor, to permit such union; however, it is understood that any types of removable mating configurations between plugs 330 and 350 may be used in example embodiments and methods.

As shown in FIG. 2B, male end plug 330 and female end plug 350 may be joined to form a connection 300. As described in the '667 application, because the connection 300 provides a solid segment containing no fuel or other irradiation targets, spacers (not shown) may be placed at these connections 300 without risk of fretting segmented rod 100 and releasing fission products. Further, as shown in FIG. 2B, indentations, or hexes, 357 may demarcate the separation between end plugs 330/350 and rod segments 110 containing irradiation targets, permit easier removal of end plugs 330/350 from rod segments 110, and/or provide guidance as to where rod segments 110 should be disconnected to harvest isotopes therefrom. Removing end plugs 330/350 from segments 110 that house container assemblies 600 (shown in FIG. 1) may permit access to and harvesting of those container assemblies 600. Similarly, connections 300A (shown in FIG. 1) may provide similar connections between other segments and upper or lower extensions 120/130.

As is described in further detail in the documents incorporated by reference above, example segmented rods 100 may be used in nuclear reactors to irradiate irradiation targets contained therein and produce power and/or desired isotopes. The inventors of the present disclosure have contemplated removing example segmented rods 100 from the reactor after power operations and harvesting desired isotopes produced in the rod segments 110. The inventors of the present disclosure have further recognized that it may be advantageous to recycle portions of the segmented rods 100 and handle/dispose/store remaining components of segmented rods 100 after harvest in an efficient and safe manner. The inventors of the present disclosure have further recognized that it may be advantageous to minimize the amount of remaining components of segmented rods 100 after becoming radioactive by exposure to neutron flux in an operating commercial nuclear reactor.

Example embodiments and methods provide structures for handling, transport, and recycling of the above-described segmented rods 100 after they have been harvested for desired isotopes produced by exposure to neutron flux in a reactor and methods for fabricating and using such structures.

Figure 3:
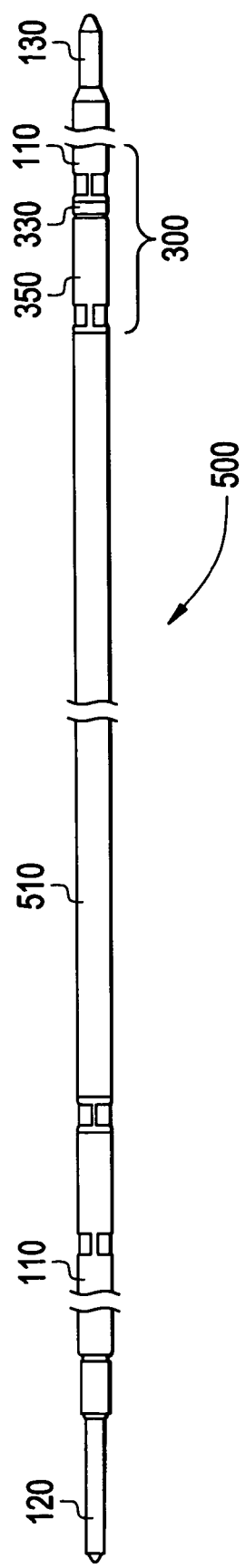
FIG. 3 is an illustration of an example embodiment segmented waste rod and waste rod segment.

FIG. 3 is an illustration of an example embodiment segmented waste rod 500. As shown in FIG. 3, segmented waste rod 500 may largely resemble example segmented rod 100 discussed in FIG. 1, having modular segments 10. Segmented waste rod 500, however, contains at least one waste segment 510 that is capable of containing recyclable and/or disposable materials from the irradiation target containing segment 110 after harvesting desirable isotopes therefrom.

As shown in FIG. 3, segmented waste rod 500 may retain the same upper extension 120 and/or lower extension 130 from segmented rod 100 (shown in FIG. 1). Segmented waste rod 500 may further retain one or more rod segments 110, including, for example, rod segments 110 containing only nuclear fuel and/or lacking any segregated irradiation targets 620 or container assemblies 600 (shown in FIG. 1). One or more waste segment 510 may be joined between the remaining rod segments 110 and/or upper and lower extensions 120/130 as discussed below.

Alternatively, segmented waste rod 500 may include only waste rod segments 510. Waste rod 500 and waste rod segments 510 may be any length as desired, for example, lengths that maximize storage capacity and/or lengths that fit in a shipping cask. Similarly, outer diameter, length, and/or shape of segmented waste rod 500 may be substantially similar to conventional fuel rods or example segmented rods discussed above and in the '677 document to permit, for example, interchangeability of segmented waste rods 500 with other rods in nuclear fuel bundles.

As shown in FIG. 3, waste rod segments 510 may be joined between upper and/or lower extensions 120/130, other segments 110, and/or other waste rod segments 510 in a similar manner described above with regard to segmented rod 100 in FIG. 1. Waste rod segment 510 may be joined to male end plugs 330 and/or female end plugs 350 at either end. End plugs 330 and/or 350 may be joined to waste rod segment 510 by any known mechanism, including, for example, by welding, screwing, and/or fastening. Through male and/or female end plugs 330/350, waste rod segment 510 may join to other female and/or male end plugs 350/330, other waste rod segments 510, irradiation-target containing segments 110, and/or extensions 120/130 to make up example embodiment segmented waste rod 500.

Figure 4:
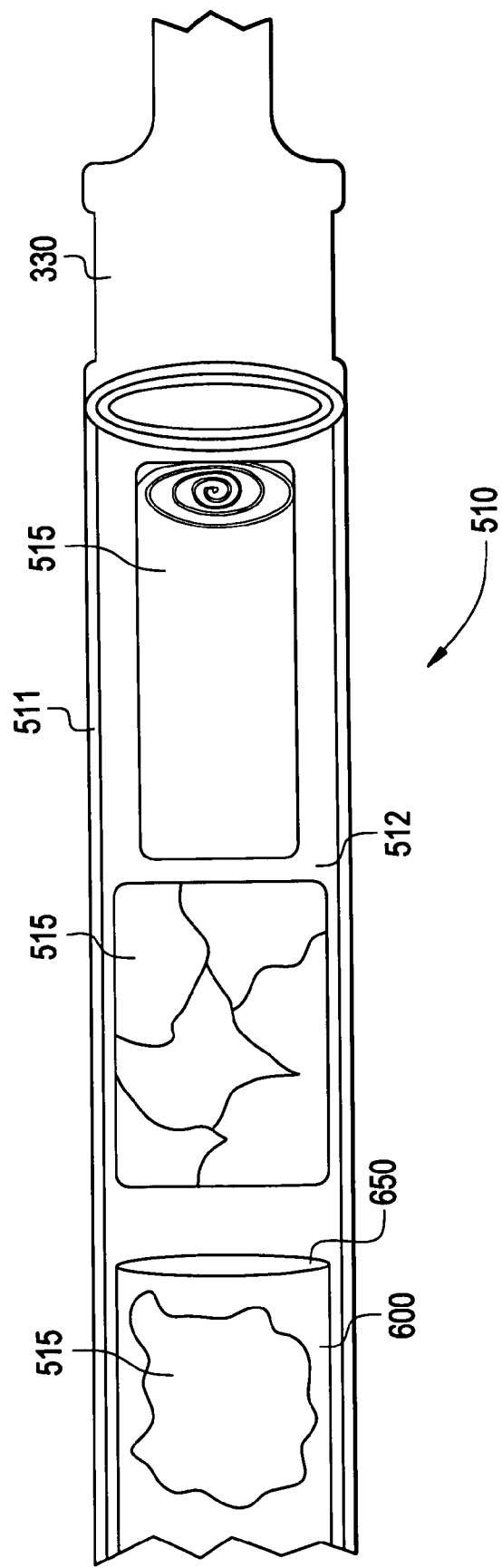
FIG. 4 is a profile view of an example embodiment waste rod segment containing waste.

FIG. 4 is a cross-sectional view of example embodiment waste rod segment 510 showing potential contents. As shown in FIG. 4, waste rod segment 510 may share several characteristics with other segments 110. Waste rod segment 510 may be generally cylindrical and include an outer cladding 511. Cladding 511 may have a thickness and be fabricated of a material similar to that of conventional fuel cladding, including, for example, zirconium or stainless steel alloys. Cladding 511 may have an inner diameter permitting formation of a containment cavity 512 within waste rod segment 510 but maintaining an outer diameter that is substantially uniform throughout example embodiment segmented waste rods and similar to outer diameters of conventional nuclear fuel rods.

As shown in FIG. 4, containment cavity 512 may accommodate and provide radioactive containment to several pieces and types of waste 515 and container assemblies 600, which are discussed in detail below. Containment cavity 512 may be sealed by, for example, welding male end plug 330 to the cladding 511 at an open end of the waste rod segment 510. Alternatively, other seals, including, for example, cladding 511 and/or female end plug 350, may close cavity 512. It is understood that any type and combination of barrier(s) providing containment and closure to cavity 512 may be used in example embodiments. Further, end plugs 330/350 used to seal cavity 512 may be newly provided or recycled from used segments 110 after harvesting isotopes therefrom.

Any type of waste 515 may be placed within waste rod segment 510. Waste may be compressed into containment cavity 511 to maximize waste density. It is understood that the following discussion of types of waste 515 insertable in example embodiment waste rod segments is not exclusive, and several different materials/objects may be contained by example embodiment waste segments. Waste 515 may include several components left over from rod segments 110 following harvesting of desired isotopes from irradiation targets 620 (shown in FIG. 1) therein. For example, cladding of rod segments 110 may be cut and rolled to fit within cavity 512. Similarly, one or more end plugs 350/330 removed from rod segments 110 during the harvesting process may be crushed and inserted into cavity 512. One or more container assemblies 600 with its associated cap 650 may be placed into cavity 512 after irradiation targets are removed from the container assembly 600. Liquid, gaseous, and/or solid waste may further be placed within container assembly 600 placed into cavity 512. Preparation of waste 515 is discussed in greater detail below with regard to example methods.

Waste rod segment 510 containing desired waste 515 may be connected between other waste rod segments 510, extensions 120/130, and/or remaining rod segments 110 as discussed above to form segmented waste rod 500 (FIG. 3). Depending on the length and type of segments in segmented waste rod 510, it may be possible to place waste rod 510 into a spent fuel bundle to be disposed of or stored in a spent fuel pool. Further, segmented waste rod 510 may take the place of any segmented rod 100 removed from the fuel bundle and disposed of in segmented waste rod 510, such that all non-harvestable parts of any fuel bundle are ultimately disposed or stored within that bundle having at least one segmented waste rod 510. Alternatively, segmented waste rod 510 may replace a conventional fuel rod removed from a bundle. Example embodiment waste segments and segmented waste rods may provide containment and storage of radioactive waste generated through the isotope harvesting process discussed in the incorporated documents and/or any other desired waste.

EXAMPLE METHODS

Example embodiment segmented waste rods and waste segments being discussed, example methods of disposing waste will now be described with reference to FIG. 5, with further reference to example embodiments shown in FIGS. 3 and 4 usable with example methods.

Figure 5:
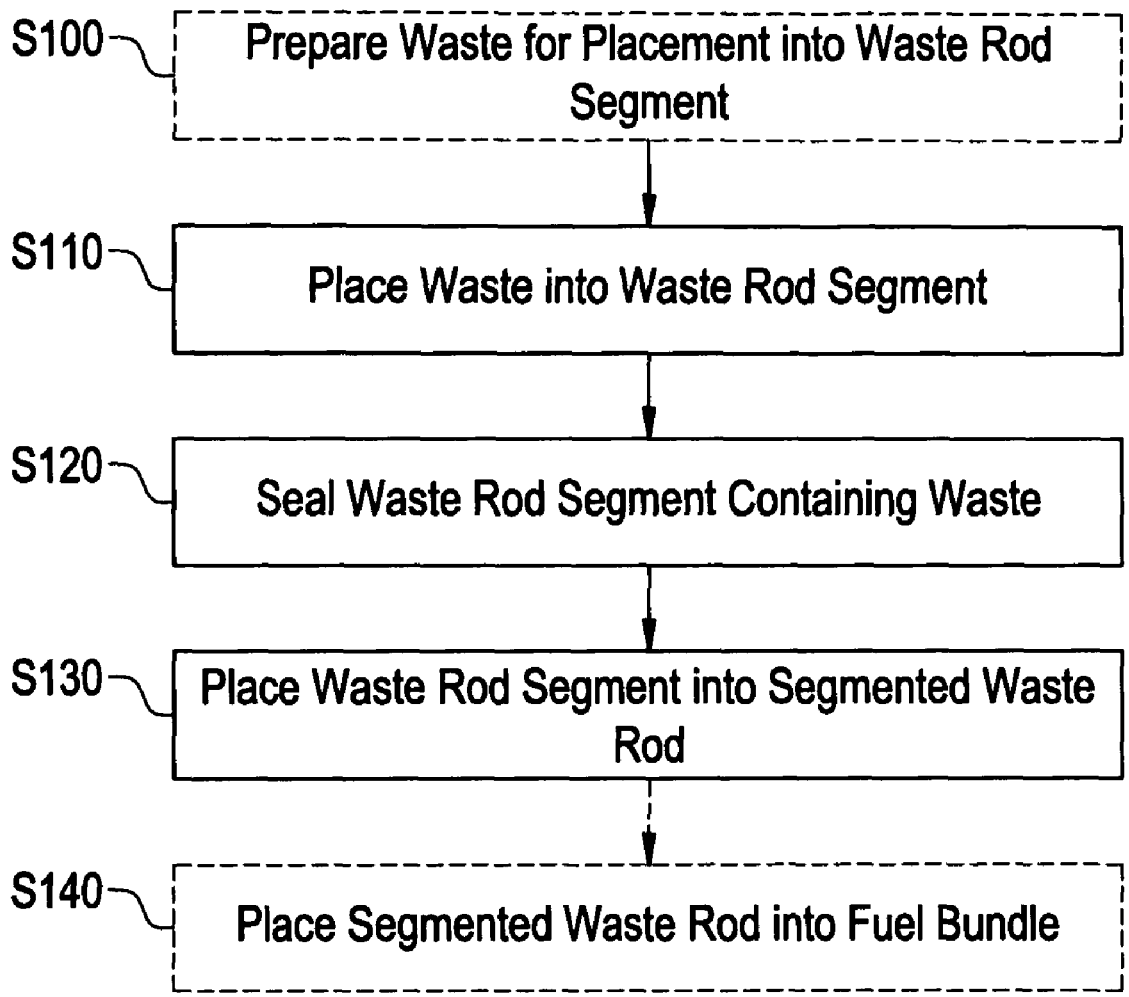
FIG. 5 is a flow chart illustrating an example method.

FIG. 5 is a flow chart illustrating an example method of handling and/or storing waste using segmented waste rods. Example methods may be applicable after all desired radioisotopes have been harvested from selected burnt segmented rods—"burnt" being defined herein as having been exposed to neutron flux in an operating nuclear reactor. Example methods may also be applicable at other times when it is desirable to store and/or dispose of waste.

As shown in FIG. 5, waste, including waste 515 discussed above with respect to FIG. 4, for example, may first be prepared in optional step S100 for placement into example embodiment waste rod segments. Step S100 may include, for example, rolling, cutting, and/or curling cladding of a removed and harvested rod segment 110 such that it may fit within an example embodiment waste rod segment 510. Step S100 may include, for example, compressing and/or placing waste into an empty container assembly 600 and optionally replacing cap 650 onto container assembly 600. Step S100 may include, for example, crushing one or more end plugs 330/350 to fit within an example embodiment waste rod segment 510, including end plugs 330/350 that may have been removed in harvesting isotopes from rod segments 110. Step S100 may include preparing any of the above-discussed pieces and additional waste pieces to fit within example embodiment waste rod segment 510, it being understood that some waste may potentially require little or no preparation before being insertable into example embodiment waste rod segments 510. Thus, step S100 is optional for waste requiring no preparation.

Step S110 includes placing the waste prepared in Step S100 into an example embodiment waste rod segment. Step S110 may include compressing and/or compacting waste within/into the segment to maximize waste density within the segment. Waste may be placed into a waste rod segment until the segment is full; however, waste segments may be completely or partially empty in example methods, depending on an amount of waste to be disposed.

Step S120 includes sealing the waste rod segment having waste placed therein in step S110. Example embodiment waste rod segments may be sealed in a variety of ways. For example, an end plug 330/350 of the appropriate type, for example, a plug of the opposite type of the other end plug 350/330 of the waste rod segment, may be welded onto the filled waste rod segment in step S120. Additionally or alternatively, another barrier may be used to seal the waste rod segment, including, for example, cladding material or another containing mechanism.

The sealed waste rod segment 510 is placed into an example embodiment segmented waste rod 500 in Step S130 by attaching it between other members of the segmented waste rod. Step S130 may include mating an end plug 330/350 at an end of the waste rod segment with a corresponding end plug 350/330 of another waste rod segment 510 or rod segment 110. Alternatively, the waste rod segment may be welded to an end plug 350/330 of another waste rod segment 510 or rod segment 110. Alternatively, the waste rod segment may be mated to an upper or lower extension 130/120 via an end plug 330/350 at an end of the waste rod segment.

In this way, example methods may form a segmented waste rod 500 including at least one waste rod segment 510. It is understood that example embodiment segmented waste rods 500 may include up to several example embodiment waste rod segments 510, and steps S100-S130 may be repeated for each desired waste rod segment to form an example embodiment segmented waste rod.

Further, example embodiment waste rod segments 510 may be any length and number so as to achieve a desired final length of an example embodiment segmented waste rod 500 through example methods. For example, it may be desirable for a segmented waste rod to have a length substantially equal to conventional fuel rods, and, based on the length of any rod segments to remain in the segmented waste rod and amount of waste to be disposed in segmented waste rod, the number and length of waste rod segments prepared and attached in steps S100-S130 of example methods may be calculated to achieve the desired length.

Optionally, the segmented waste rod 500 fabricated in steps S100-S130 may be placed into a fuel bundle in step S140 for storage and/or disposal. Example embodiment segmented waste rods may have a length substantially similar to other short-length or full-length rods in the bundle, and thus the bundle may have a configuration and geometry substantially similar to bundles lacking waste rods and may be stored similarly. For example, bundles having segmented waste rods placed therein in Step S140 may be placed in long-term storage facilities such as spent fuel pools or disposed of in special waste depositories.

Example methods may be performed at facilities suitable for handling radioactive and other nuclear waste. Waste inserted into example embodiment waste rod segments in example methods may have been irradiated for lengthy periods of time in operating nuclear reactors and thus may be considerably radioactive and require sufficient health safety equipment for handling such waste in example methods. Further, additional equipment, such as hot cells, may be used in example methods to properly and safely handle and separate waste processed in example methods and disposed of in example embodiments.

Because example embodiment segmented waste rods and methods of forming the same may substantially dispose of and/or recycle waste remaining from harvesting segmented rods, including, for example, upper and lower extensions, end plugs, container assemblies and caps, and segmented rod cladding, and may be compatible with/insertable into the same fuel bundle from which the segmented rod was taken, example waste rods may eliminate any need for alternate disposal methods and may consume less disposal facility volume in general.

Example embodiments thus being described, it will be appreciated by one skilled in the art that example embodiments and methods may be varied through routine experimentation and without further inventive activity. Variations are not to be regarded as departure from the spirit and scope of the described example embodiments, and all such modifications as would be obvious to one skilled in the art are intended to be included within the scope of the following claims.

What is claimed is:

1. A segmented waste rod comprising:
    a plurality of burnt rod segments,
        the rod segments being removably mated to each other in an axial direction,
        the rod segments being individually cladded, and
        the rod segments forming a continuous multi-segment waste rod; and
        at least one of the rod segments being a waste rod segment containing at least one piece of non-fuel waste sealed within the waste rod segment after harvesting isotopes produced in the waste rod segment in a nuclear reactor from the waste rod.

2. The segmented waste rod of claim 1, wherein the at least one piece of waste includes material from a harvested burnt rod segment.

3. The segmented waste rod of claim 2, wherein the at least one piece of waste is selected from the group consisting of a cladding, a container assembly, a male end plug, and a female end plug.

4. The segmented waste rod of claim 2, wherein the segmented waste rod has a length and outer diameter substantially similar to the burnt segmented rod.

5. The segmented waste rod of claim 1, wherein at least one of the rod segments not containing waste contains spent nuclear fuel.

6. The segmented waste rod of claim 1, further comprising:
    a lower extension removably mated to a first rod segment of the plurality of rod segments at a first end of the segmented waste rod; and
    an upper extension removably mated to a second rod segment of the plurality of rod segments at a second end of the segmented waste rod, the upper extension and the lower extension being recycled from a burnt segmented rod.

7. The segmented waste rod of claim 1, wherein the rod segments are removably mated via a male end plug and a female end plug.

8. A method for handling nuclear waste, the method comprising:
    harvesting isotopes produced in a rod segment in a nuclear reactor from the rod segment;
    placing the waste into the rod segment so as to form a waste rod segment;
    sealing the waste rod segment; and
    placing the waste rod segment into a segmented waste rod by axially mating the waste rod segment to at least one of an upper extension, a lower extension, a rod segment containing spent nuclear fuel, and another waste rod segment.

9. The method of claim 8, further comprising:
    preparing the waste for placement into the waste rod segment before placing the waste into the waste rod segment.

10. The method of claim 8, wherein the waste includes material from a harvested burnt rod segment.

11. The method of claim 10, wherein the waste includes at least one of a cladding, a container assembly, a male end plug, and a female end plug of the harvested burnt rod segment.

12. The method of claim 8, further comprising:
    placing the segmented waste rod into a fuel bundle.

13. The method of claim 8, wherein placing the waste into the waste rod segment includes compressing the waste into the waste rod segment.

14. The method of claim 8, wherein the sealing the waste rod segment includes welding one of a female end plug and a male end plug to an open end of the waste rod segment.

15. A method of handling waste generated from a process of harvesting isotopes from a burnt segmented fuel rod, the method comprising:
    rolling, cutting, and curling cladding from a rod segment harvested for isotopes;
    crushing at least one end plug removed from the rod segment harvested for isotopes;
    placing the cladding, at least one end plug, a container assembly removed from the rod segment harvested for isotopes, and a cap of the container assembly into a waste rod segment;
    sealing the waste rod segment; and
    placing the waste rod segment in the burnt segmented fuel rod in a location from which the rod segment harvested for isotopes was taken so as to form a segmented waste rod.

16. The method of claim 15, further comprising:
    inserting the segmented waste rod into a burnt fuel bundle in a location from which the burnt segmented fuel rod was taken.

* * * * *